US008590966B2

(12) United States Patent
Gaines et al.

(10) Patent No.: US 8,590,966 B2
(45) Date of Patent: Nov. 26, 2013

(54) NON-NEWTONIAN STRESS THICKENING FLUID VIBRATION DAMPER SYSTEM FOR VEHICLE SEAT

(75) Inventors: David William Gaines, Farmington, MI (US); Peter T. Mueller, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 13/207,516

(22) Filed: Aug. 11, 2011

(65) Prior Publication Data

US 2013/0038112 A1 Feb. 14, 2013

(51) Int. Cl.

| | |
|---|---|
| ***B60N 2/42*** | (2006.01) |
| ***B60N 2/48*** | (2006.01) |
| ***B60N 2/64*** | (2006.01) |
| ***B60N 2/68*** | (2006.01) |

(52) U.S. Cl.

USPC .............. 297/216.13; 297/216.1; 297/216.12; 297/452.18; 297/452.2

(58) Field of Classification Search

USPC ............... 297/216.1, 216.13, 452.18, 216.12, 297/452.2

See application file for complete search history.

(56) References Cited

U.S. PATENT DOCUMENTS

| | | | | |
|---|---|---|---|---|
| 4,350,390 | A * | 9/1982 | Ogawa | 297/452.18 |
| 5,306,073 | A * | 4/1994 | Rees | 297/216.1 X |
| 6,378,946 | B1 * | 4/2002 | Cope et al. | 297/452.18 X |
| 6,761,412 | B1 * | 7/2004 | Garnweidner et al. | 297/452.18 |
| 7,448,678 | B2 * | 11/2008 | Browne et al. | 297/216.12 |
| 7,594,697 | B2 * | 9/2009 | Browne et al. | 297/216.12 |
| 7,712,832 | B2 | 5/2010 | Booth et al. | |
| 7,758,121 | B2 * | 7/2010 | Browne et al. | 297/216.1 X |
| 8,016,350 | B2 * | 9/2011 | Dellanno | 297/216.13 X |
| 2005/0269856 | A1 * | 12/2005 | Kim | 297/452.18 |
| 2007/0246285 | A1 | 10/2007 | Browne et al. | |
| 2009/0004413 | A1 | 1/2009 | Wagner et al. | |
| 2010/0171349 | A1 * | 7/2010 | Dellanno | 297/216.12 |
| 2010/0221521 | A1 | 9/2010 | Wagner et al. | |

OTHER PUBLICATIONS

S.B. Choi et al., "Vibration Control of an ER Seat Suspension for a Commercial Vehicle," Transactions of the ASME, vol. 125, pp. 60-68, Mar. 2003.

* cited by examiner

*Primary Examiner* — Rodney B White

(74) *Attorney, Agent, or Firm* — Shook, Hardy & Bacon LLP

(57) ABSTRACT

A vibration damper for a vehicle seat back is disclosed. The vibration damper includes an enclosure provided inside the upper end of a vehicle seat back. The enclosure includes a plurality of projections, preferably in the form of spaced apart, vertically extending pins, extending from one or more interior walls of the enclosure. A non-newtonian stress thickening fluid is provided within the enclosure. When the seat back is at rest the stress thickening fluid is free flowing within the enclosure. When the seat back is moved the stress thickening fluid is acted upon by the walls of the enclosure, the internally mounted pins, or both. As the walls and pins push on the fluid it comes under shear stress which causes the fluid to harden. As the pins pass through the hardened fluid they absorb energy and dampen the motion.

20 Claims, 3 Drawing Sheets

NON-NEWTONIAN STRESS THICKENING FLUID VIBRATION DAMPER SYSTEM FOR VEHICLE SEAT

TECHNICAL FIELD

The disclosed invention relates generally to vibration damper systems for vehicles. More particularly, the disclosed invention relates to a vibration damper system for a vehicle seat that includes an enclosure having a plurality of spaced apart pins. A stress thickening fluid is provided within the housing. When subjected to vibration the shear stress causes the fluid to thicken. As the spaced apart pins pass through the thickened fluid they absorb energy and dampen the motion.

BACKGROUND OF THE INVENTION

Vehicle designers today are challenged by many requirements of both design and performance. One of the most important requirements, and often one of the most difficult to achieve, is directed to the management and reduction of noise, vibration and harshness, or NVH.

An area of particular concern is the transmission of vehicle vibrations to the vehicle seats, a problem that is most pronounced in the operation of trucks and off-road vehicles. The problem is also more apparent in heavier seats having greater mass due to a higher component content (such as, but not limited to, power lumbar mechanisms, climate controlled seats, multi-way power tracks, and power recline mechanisms).

Unoccupied passenger seats are most vulnerable to vibration. Without the mass of an occupant available for dampening, the unoccupied passenger seat may be shaken, thus causing a visible motion in the seat. The driver may notice this movement and may be annoyed or distracted by the seat motion. A shaking seat may also generate an audible noise, such noise also being an annoyance or distraction to the driver and other vehicle occupants.

Attempts have been made to reduce the amount of vibration introduced to the seat with varying degrees of success. One general effort is directed to increasing the stiffness of the seat. While reducing vibration this approach sacrifices occupant comfort and may result in poor performance in a rear-impact event.

Another attempt at reducing seat vibration relies on mass tuned damper technology. A tuned mass damper is also known as a harmonic absorber or an active mass damper designed to stabilize against harmonic vibration. The tuned mass damper may be any of a variety of devices with the common goal of reducing the amplitude of mechanical vibrations.

Particularly, as applied to the vehicle seat, a mass tuned damper is incorporated into the seat back, typically but not exclusively in the passenger seat back, to dampen vibrations transmitted to the seat back. This approach relies on a rubber coated mass tuned damper.

While offering certain improvements this approach also suffers from certain disadvantages. One disadvantage is production cost. The current mass tuned damper is an overmolded rubber steel mass attached to the seat back frame. Costs related to overmolding and to the requisite hand trimming of flash are high. In addition, to be effective at reducing or eliminating vibration the mass tuned damper needs to be tuned to the frequency of the seat. This also adds expense to the production and use of this element.

Known rubber coated mass tuned dampers tend to be heavy and thus add undesirably to the overall weight of the vehicle. Additional vehicle weight runs contrary to the goal of vehicle weight reduction for the sake of improved fuel economy.

Another disadvantage related to the use of the mass tuned damper has to do with space restrictions. The rubber coated mass tuned damper has limited range of fore/aft motion and lateral motion before contacting the seatback frame. Particularly, when the rubber coated mass contacts the back frame it generates an audible thumping sound when the vehicle is driven over a rough area, such as a railroad track or a speed bump. Because of inherent spaced restrictions little improvement related to reduction or elimination of the thumping sound can be expected through the use of current technology Accordingly, as in many areas of vehicle technology room for improvement remains in the art of dampening of vehicle seat vibration.

SUMMARY OF THE INVENTION

The disclosed invention provides an alternative arrangement to known vibration dampening systems for vehicle seat backs. The vibration damper for a vehicle seat back of the disclosed invention includes an enclosure provided inside the upper end of a vehicle seat back. The enclosure includes a plurality of projections, preferably in the form of spaced apart, vertically extending pins, extending from one or more interior walls of the enclosure. A non-newtonian stress thickening fluid is provided within the enclosure. The stress thickening fluid may contain particles, such as silica particles.

When the seat back is at rest the stress thickening fluid is free flowing within the enclosure. When the seat back is moved the stress thickening fluid is acted upon by the walls of the enclosure, the internally mounted pins, or both. As the walls and pins push on the fluid it comes under shear stress which causes the fluid to harden. As the pin passes through the hardened fluid they absorb energy and dampen the motion.

The disclosed damper offers important advantages over known solutions to reducing or eliminating vibrations in the vehicle seat. The disclosed damper does not require the stiffening of the seat as in some approaches. The cost of manufacturing the injection molded or die cast housing and installing the fluid-filled enclosure of the disclosed invention is considerably less than manufacturing and installation costs of the rubber coated mass tuned damper of known technology. The fluid-filled enclosure of the disclosed invention also eliminates costs related to tuning of known mass tuned dampers insofar as the disclosed damper will dampen vibration over a greater range of frequencies than known technologies thus requiring fewer damper designs and increasing standardization.

Furthermore, the disclosed invention also overcomes the audible thumping sound sometimes heard with known systems when the rubber coated mass contacts the back of the seat frame insofar as the fluid in the fluid-filled enclosure of the disclosed invention reaches the full range of motion is hardens under the stress and quietly comes to a stop.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
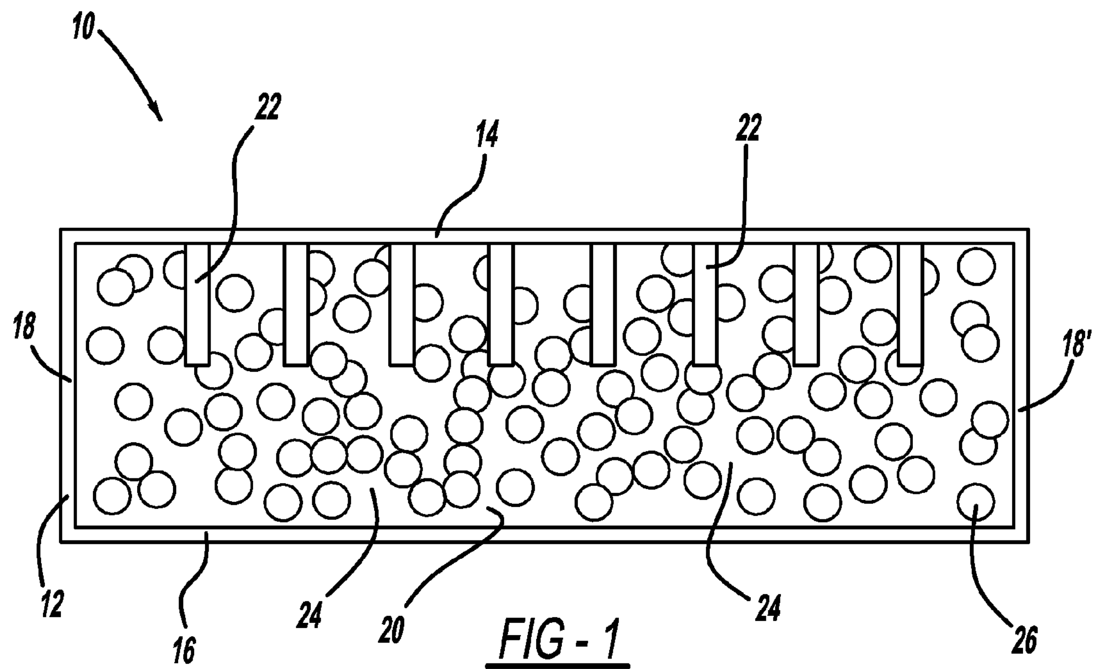
FIG. 1 is a diagrammatic sectional view of the enclosure of the dampener according to the disclosed invention having a stress thickening fluid contained therein.

In the following figures, the same reference numerals will be used to refer to the same components. In the following description, various operating parameters and components are described for different constructed embodiments. These specific parameters and components are included as examples and are not meant to be limiting.

Figure 2:
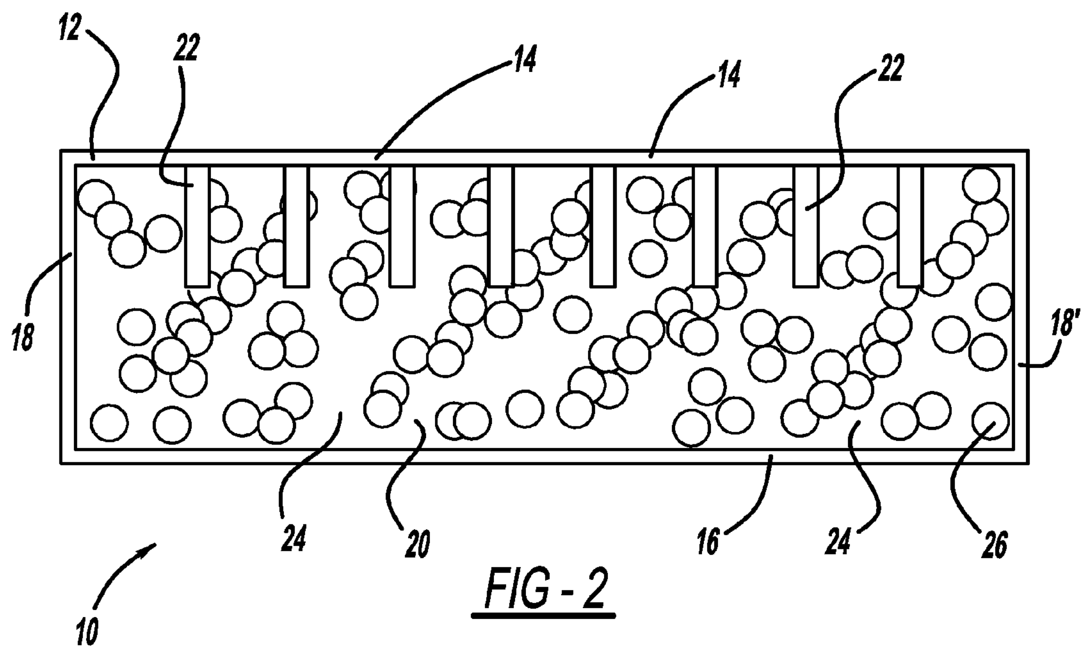
FIG. 2 is the same view as FIG. 1 but illustrating the stress thickening fluid having been thickened as a result of external vibrations.

Referring to FIGS. 1 and 2, a diagrammatic sectional view of an enclosure, generally illustrated as 10, is shown. The illustrated shape and size of the enclosure 10 is suggestive and is not intended as being limiting as other shapes and sizes may be suitable for the purpose. The enclosure 10 includes a housing 12. The housing 12 may be composed of a variety of materials such as plastic or metal and may be produced by a variety of known processes, including but not limited to injection molding, die casting, and stamping.

The housing 12 is preferably comprised of a top wall 14, a bottom wall 16, a pair of opposed side walls 18 and 18', and a back wall 20. One or more projections 22 extend from one of the walls of the housing 12. The projections 22 are preferably pins as illustrated although a variety of shapes and sizes of projections can be used for this purpose. The illustrated shape, configuration, spacing, placement and number of projections 22 are suggestive and not limiting. In addition, the projections 22 are shown vertically mounted and while this is a preferred arrangement it is not an exclusive one as horizontally mounted projections may be used in addition or instead of the illustrated vertically mounted ones. Furthermore, the projections 22 are shown as being attached to the top wall 14. It is to be understood that the projections 22 may be mounted on other walls either in addition or as an alternative to the illustrated arrangement.

A stress thickening fluid 24, preferably a non-newtonian stress or shear thickening fluid, is provided within the enclosure 10. The stress thickening fluid 24 is one in which viscosity increases when either stress is increased or where the shear rate is increased. In certain ones of these fluids high shear rates cause the fluid to embody solid or rigid properties. These fluids are selected from the group consisting of polyethylene glycol or ethylene glycol, although other fluids for this application are known and may be utilized.

Optionally but not necessarily the stress thickening fluid 24 has a suspension of colloidal particles 26. Such particles typically are 10 microns or smaller and may be in the nanometer range. These particles are generally solid particles such as silica particles.

In FIG. 1, the enclosure 10 is illustrated in its resting, unstressed state. In this condition the stress thickening fluid 24 is free flowing. This may be referred to as its first state. When the enclosure 10 is subjected to vibration as shown in FIG. 2 the stress thickening fluid 24 moves about the enclosure 10 and interacts with the walls 14, 16, 18, 18' and 20 (as well as a front wall shown in FIG. 4) as well as with the projections 22. In so doing the stress thickening fluid 24 comes under shear stress. In this condition, the second state, the stress thickening fluid 24 is caused to harden. As the projections 22 pass through the hardened stress thickening fluid 24 they absorb energy and dampen the motion.

Figure 3:
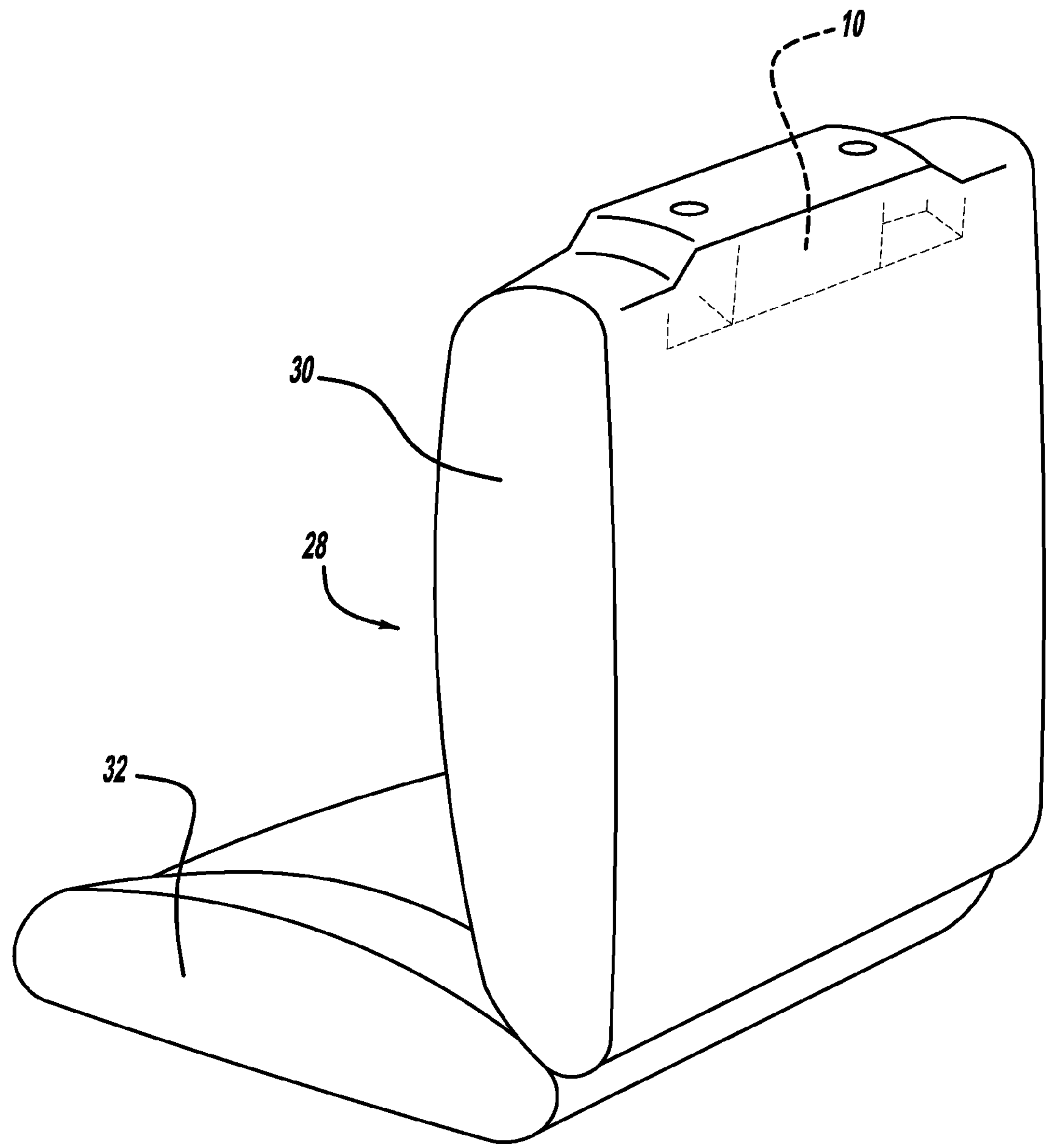
FIG. 3 perspective view of a vehicle seat having the dampener of the disclosed invention installed therein.

The enclosure 10 may be used in a number of vibration dampening situations but is preferably employed in conjunction with a seat 28 of a vehicle as shown in FIG. 3. The seat 28 conventionally includes a seat back 30 and a seat base 32. The enclosure 10 is located within the seat back 30 and is preferably located in the upper area of the seat back 30 as illustrated in FIG. 3. One or more additional enclosures 10 may be fitted within the seat back 30.

Figure 4:
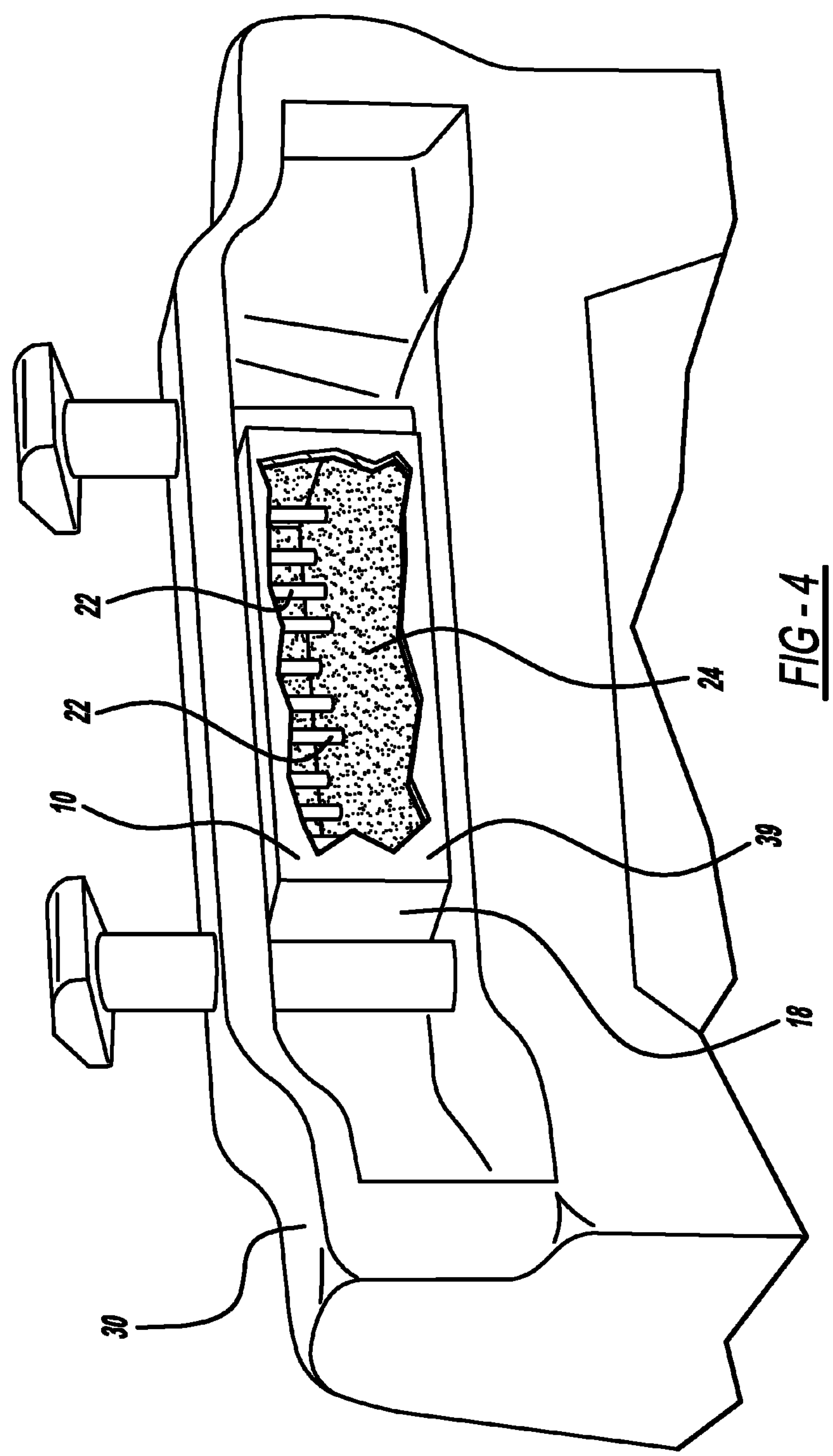
FIG. 4 is a sectional view of the seat back of the vehicle seat of FIG. 3 showing the dampener enclosure of the disclosed invention in partial cutaway.

A preferred placement of the enclosure 10 is shown in FIG. 4 in which a sectional view of the seat back 30 of the vehicle seat 29 of FIG. 3 is illustrated. The enclosure 10 is shown in partial cutaway. The view of FIG. 4 more clearly shows the placement of the enclosure 10 within the seat back 30 and also shows the back wall 34 of the housing 12.

While the vibration dampening system of the disclosed invention has been described above for application with a vehicle seat, other applications may be suitable. For example, the same or a similar system may be used with low effort anti-rattle headrest guides. In addition, a material such as Kevlar (trademark) may be impregnated with a stress thickening fluid under the “A” surface of the seat such that it becomes substantially rigid on rear impact keeping the occupant from sinking into the foam too deeply while distributing loads across the whole body and to the seat back frame The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vibration damper for a seat back for a vehicle comprising:

an enclosure having an interior wall and a motion-dampening projection extending from said interior wall; and a stress thickening fluid contained within said enclosure, at least a portion of said projection extending into said fluid.

2. The vibration damper for a seat back of claim 1 wherein said enclosure is die cast.

3. The vibration damper for a seat back of claim 1 wherein said enclosure is injection molded.

4. The vibration damper for a seat back of claim 1 wherein said enclosure is composed of a polymerized material.

5. The vibration damper for a seat back of claim 1 wherein said projection is a pin.

6. The vibration damper for a seat back of claim 1 wherein said enclosure includes a second wall and wherein said projection is a plurality of projections, said projections extending from said walls of said housing.

7. The vibration damper for a seat back of claim 1 wherein said projection is at least one pin.

8. The vibration damper for a seat back of claim 7 wherein said at least one pin includes a plurality of pins.

9. The vibration damper for a seat back of claim 8 wherein said enclosure includes a vertical direction and a horizontal direction and wherein said plurality of pins are vertically mounted.

10. The vibration damper for a seat back of claim 1 wherein said stress thickening fluid is a non-newtonian stress thickening fluid.

11. The vibration damper for a seat back of claim 1 wherein said stress thickening fluid contains silica particles.

12. The vibration damper for a seat back of claim 1 wherein said stress thickening fluid is changeable between a first state and a second state, said second state being more rigid than said first state.

13. A vibration dampening seat back for a vehicle comprising:

a seat back; and a vibration dampener integrated substantially within said seat back, said dampener comprising an enclosure having an interior and a stress thickening fluid, said fluid being contained within said interior of said enclosure, said enclosure having a motion-dampening projection extending into said interior, at least a portion of said projection extending into said fluid.

14. The vibration dampening seat back for a vehicle of claim 13 wherein said stress thickening fluid is a non-newtonian stress thickening fluid.

15. The vibration dampening seat back for a vehicle of claim 13 wherein said projection is at least one pin.

16. The vibration dampening seat back for a vehicle of claim 15 wherein said at least one pin comprises a plurality of pins.

17. A dampening system for dampening vibration comprising:

an enclosure having an interior, said enclosure including a motion-dampening projection extending into said interior; and a stress thickening fluid disposed within said interior of said enclosure, at least a portion of said projection extending into said fluid.

18. The dampening system of claim 17 wherein said projection is at least one pin.

19. The dampening system of claim 18 wherein said enclosure includes a vertical direction and a horizontal direction and wherein said at least one pin is a plurality of vertically mounted pins.

20. The dampening system of claim 17 wherein said stress thickening fluid is changeable between a first state and a second state, said second state being more rigid than said first state.

* * * * *